United States Patent
Sakano

Patent Number: 4,760,464
Date of Patent: Jul. 26, 1988

[54] SHADING CORRECTION SYSTEM FOR IMAGE SCANNING APPARATUS

[75] Inventor: Yukio Sakano, Fuchu, Japan

[73] Assignee: Ricoh Company, Ltd., Tokyo, Japan

[21] Appl. No.: 66,546

[22] Filed: Jun. 26, 1987

[30] Foreign Application Priority Data

Jun. 30, 1986 [JP] Japan ................. 51-152945

[51] Int. Cl.⁴ ............................. H04N 1/40
[52] U.S. Cl. ................... 358/282; 358/284; 382/53
[58] Field of Search ......... 358/282, 284; 382/50, 382/52, 53

[56] References Cited

U.S. PATENT DOCUMENTS

| | | | |
|---|---|---|---|
| 4,578,711 | 3/1986 | White et al. | 358/282 |
| 4,601,058 | 7/1986 | Seto | 358/282 |
| 4,691,239 | 9/1987 | Nelson | 353/282 |
| 4,691,240 | 9/1987 | Kurusu et al. | 358/282 |

FOREIGN PATENT DOCUMENTS 95518  3/1978  Japan .
27675  8/1984  Japan .
94076  4/1987  Japan .

Primary Examiner—Edward L. Coles, Sr.
Attorney, Agent, or Firm—Oblon, Fisher, Spivak, McClelland & Maier

[57] ABSTRACT

A shading correction system is used in an image scanning apparatus which stores shading data which are obtained by scanning a white substrate and carries out a shading correction on the image information which is obtained by scanning an intended image by use of the stored shading data. The white substrate is scanned a plurality of times at different locations thereof and previous shading data stored in a memory are compared with present shading data so as to renew the contents of the memory depending on the compared result. The renewal of the contents of the memory is carried out in N stages, where each of the N stages carry out the comparing and renewing operation for one of N different groups of scans over the white substrate for one of N different picture element groups each comprising 1/N a total number of picture elements in each scan.

11 Claims, 5 Drawing Sheets

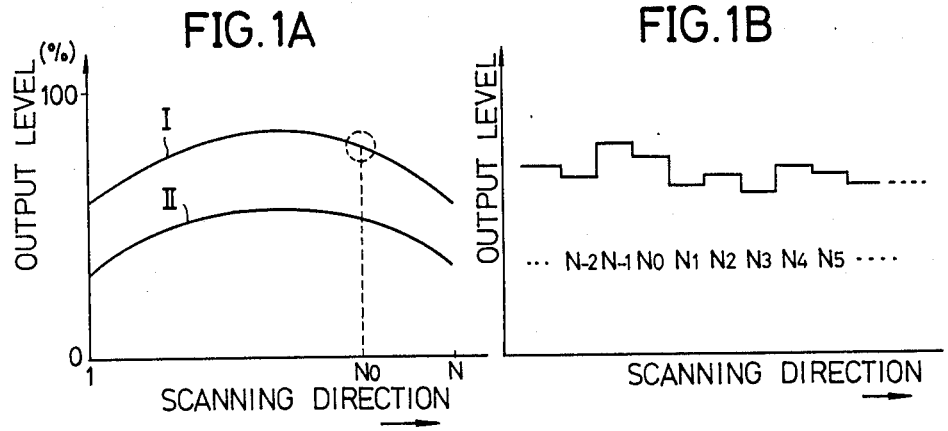
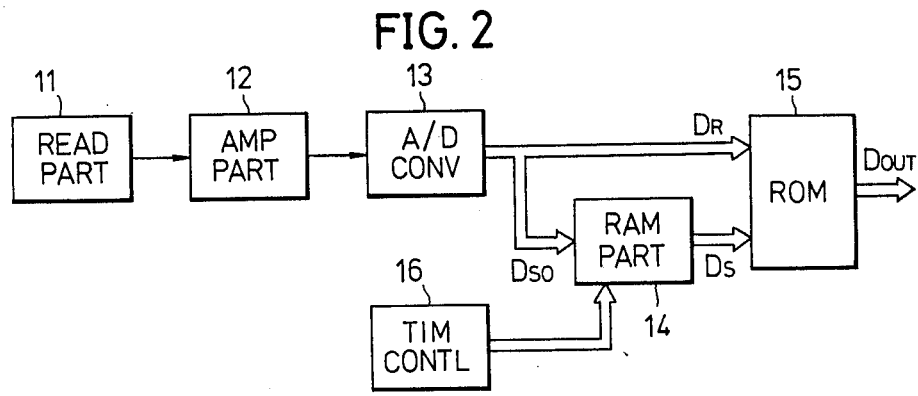
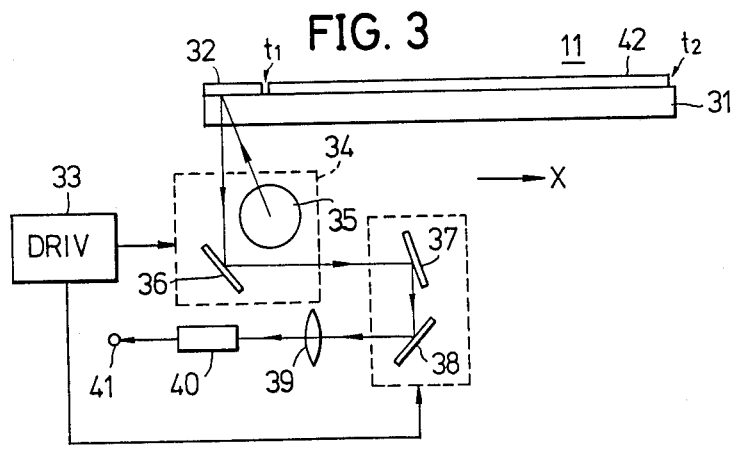

SHADING CORRECTION SYSTEM FOR IMAGE SCANNING APPARATUS

BACKGROUND OF THE INVENTION

The present invention generally relates to shading correction systems for image scanning apparatuses, and more particularly to a shading correction system for an image scanning apparatus such as a copying apparatus, a document reading apparatus including optical character recognition (ORC) and optical mark recognition (OMR) devices, a television camera and the like.

In the present specification, an image scanning apparatus refers to an apparatus which scans an image, and includes copying apparatus, a document reading apparatus including ORC and OMR devices, a television camera and the like.

Generally, in an image scanning apparatus which uses a line image sensor comprising photodetector elements arranged in a line (array), a light from a light source scans each of successive lines of an image such as a document along a main scanning direction, and the image information is read in groups of picture element data related to each line by detecting the reflected light from the scanned image in the line image sensor. However, due to the non-uniform light distribution characteristic of the light source and the inconsistency in the sensitivities of the photodetector elements constituting the line image sensor such as charge coupled devices (CCDs), an output signal level of the line image sensor changes and the so-called shading occurs. For this reason, it is necessary to carry out a shading correction so as to keep the output level of the line image sensor constant.

Conventionally, the shading correction is carried out as follows. That is, a white substrate is scanned before scanning the intended image which is to be scanned, and the output of the line image sensor is passed through an analog-to-digital (A/D) converter and stored into a random access memory (RAM) as shading data. Then, the intended image is scanned and the output of the line image sensor which is passed through the A/D converter is subjected to a predetermined operation by use of corresponding shading data read out from the RAM.

When the white substrate is scanned only once, the shading data which are obtained may contain errors caused by dust particles, paint flaw and the like on the white substrate at the scanned position. For this reason, it is desirable that the white substrate is scanned a plurality of times at different locations on the white substrate so as to obtain more accurate shading data. Hence, the shading data are conventionally obtained by scanning the white substrate a plurality of times and storing the shading data obtained for each scan, and constantly replacing a previous shading datum by a present shading datum when the present shading datum is greater than (more on the white level side of) the previous shading datum. As a result, maximum shading data obtained during the plurality of scans are read out from the RAM and used for carrying out the shading correction on the image information which is obtained from the line image sensor when the intended image is scanned.

The shading correction described above is superior compared to the case where the shading correction is carried out based on the shading data obtained during a single scan of the white substrate. Hence, even when the white substrate is partially dirty, dust particles or the like exist on the white substrate, the reflection coefficient of the white substrate is inconsistent and the like, the undesirable effects of such deficiency of the white substrate are minimized and it is possible to carry out an accurate shading correction.

When scanning the intended image, it is only necessary to read out the stored shading data from the RAM for the purpose of carrying out the shading correction based on the read out shading data. However, when scanning the white substrate and writing the shading data into the RAM, it is necessary to read out the previous shading data from the RAM, compare the previous shading data with the present shading data, and replace the previous shading datum by the present shading datum depending on the result of the comparison. In other words, the content of the RAM must be renewed at a speed in accordance with the scanning speed of the line image sensor, and there is a problem in that it is necessary to use a RAM which can operate at an extremely high speed. Furthermore, in order to make access to the RAM at the extremely high speed, the circuit construction of peripheral circuits of the RAM becomes complex. However, a RAM which operates at such an extremely high speed is expensive.

SUMMARY OF THE INVENTION

Accordingly, it is a general object of the present invention to provide a novel and useful shading correction system for an image scanning apparatus, in which the problems described heretofore are eliminated.

Another and more specific object of the present invention is to provide a shading correction system for an image scanning apparatus which stores shading data which are obtained by scanning a white substrate and carries out a shading correction on the image information which is obtained by scanning an intended image by use of the stored shading data, where the white substrate is scanned a plurality of times at different locations thereof and previous shading data stored in a memory are compared with present shading data so as to renew the contents of the memory depending on the compared result. The renewal of the contents of the memory is carried out in N stages, where each of the N stages carry out the comparing and renewing operation for one of N different groups of scans over the white substrate for one of N different picture element groups each comprising 1/N a total number of picture elements in each scan. According to the shading correction system of the present invention, it is unnecessary to use a high-speed RAM for the memory, and there is no need to use complex peripheral circuits for the memory. The memory which is used simply needs to have such an access time that the stored shading data can be read out from the memory when carrying out the shading correction on the image information which is obtained by scanning the intended image.

Other objects and further features of the present invention will be apparent from the following detailed description when read in conjunction with the accompanying drawings.

BRIEF DESCRIPTION OF THE DRAWINGS

FIGS. 1A and 1B respectively show typical shading characteristics and a portion of the shading characteristic on an enlarged scale;

FIG. 2 is a system block diagram showing an embodiment of the shading correction system according to the present invention;

FIG. 3 is a view in partial cross section showing an embodiment of a reading part of the shading correction system shown in FIG. 2;

DETAILED DESCRIPTION

Figure 4:
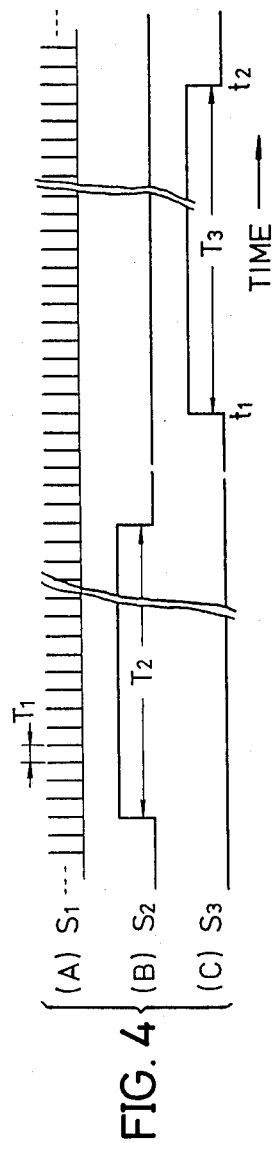
FIGS. 4(A) through 4(C) are timing charts for explaining the operation of the shading correction system shown in FIG. 2 when scanning a white substrate and scanning an intended image.

FIG. 1A shows typical shading characteristics. In FIG. 1A, the abscissa indicates the picture element position along the main scanning direction. The picture element position along the main scanning direction corresponds to each photodetector element of a line image sensor, and also corresponds to an address in a random access memory (RAM) where each shading datum is stored. When time-sequentially processing the picture element data which are obtained by scanning an intended image, the abscissa also corresponds to the time base In FIG. 1A, the ordinate indicates an output signal level of the line image sensor. The change in the output signal level of the line image sensor is caused by the change in the brightness of the light source due to aged deterioration, the non-uniform brightness of the light source in the case of a linear light source, the change in the reflection coefficient of the surface which is scanned, the characteristic of an optical system including lenses, mirrors and the like between the light source and the line image sensor, and the inconsistent sensitivities of the photodetector elements constituting the line image sensor.

In FIG. 1A, a difference between a characteristic I and a characteristic II is caused mainly by the change in the brightness of the light source due to aged deterioration. In both the characteristics I and II, the output signal level of the line image sensor has a peak at the central part and gradually falls toward the peripheral parts. The fall in the output signal level in the peripheral parts is caused by the shading, and is mainly due to the lower brightness of the linear light source at the end portions of the linear light source and due to the characteristic of the optical system.

FIG. 1B shows on an enlarged scale the characteristic I in a vicinity of a picture element position (scanning position) $N=N_0$ encircled by a phantom line in FIG. 1A. The step change in the output signal level of the line image sensor is the shading caused by the inconsistent sensitivities of the photodetector elements constituting the line image sensor.

FIG. 2 shows an embodiment of the shading correction system according to the present invention. In the present embodiment, the present invention is applied to a copying apparatus for convenience' sake. The shading correction system comprises a reading part 11, an amplifier part 12, an analog-to-digital (A/D) converter 13, a random access memory (RAM) part 14, a read only memory (ROM) 15, and a timing controller 16.

FIG. 3 shows an embodiment of the reading part 11. The reading part comprises a contact glass 31, a white substrate 32, a driving part 33, a scanning part 34 comprising a linear light source 35 and a mirror 36, a pair of mirrors 37 and 38, a lens system 39 and photodetector elements 40. The photodetector elements 40 constitute a line image sensor (not shown), and output signals of the photodetector elements 40 are serially obtained via a terminal 41 as an output signal of the line image sensor. An intended image which is to be scanned such as a document is on a paper 42 which is placed on the contact glass 31. The driving part 33 drives the scanning part 34 and the mirrors 37 and 38 so that the scanning part 34 moves in a direction X at a first speed and the mirrors 37 and 38 move in the same direction X at a second speed. The first and second speeds are set so that a ratio between the length of the light path from the surface of the document to the lens system 39 and the length of the light path from the lens system 39 to the photodetector elements 40 is kept constant. A light from the light source 35 scans along a main scanning direction (that is, into or out of the paper in FIG. 3) to scan a line, and such a scan is repeated as the scanning part 34 moves in the direction X.

At a home position of the scanning part 34 shown in FIG. 3, a light from the light source 35 is reflected by the white substrate 32. The reflected light is further reflected by the mirrors 36, 37 and 38, and reaches the photodetector elements 40 via the lens system 39. The white substrate 32 is scanned a plurality of times as the scanning part 34 moves in the direction X, and the intended image on the paper 42 is scanned after the scanning of the white substrate 32 is completed. In the present embodiment, the scanning part 34 first scans the white substrate 32 every time an intended image is to be scanned, but it is not essential that the white substrate 32 is scanned every time the intended image is to be scanned. Furthermore, it is not essential that the white substrate 32 is fixed in position.

Returning now to the description of the block system shown in FIG. 2, the output signal of the line image sensor of the reading part 11 is supplied to the amplifier part 12 wherein the signal is subjected to amplification, reproduction of the D.C. component, sample and hold and the like. An output signal of the amplifier part 12 is converted into a digital signal in the A/D converter 13. For example, the digital signal from the A/D converter 13 comprises six (6) bits for indicating the density of the document (intended image) in sixty-four (64) gradations. The output digital signal of the A/D converter 13 obtained when the white substrate 32 is scanned is stored into the RAM part 14 as shading data $D_{S0}$. On the other hand, the output digital signal of the A/D converter 13 obtained when the document is scanned is supplied to the ROM 15 as image data $D_R$, and the ROM 15 carries out the shading correction on the image data $D_R$ by using shading data $D_S$ which are read out from the RAM part 14. Hence, output image data $D_{OUT}$ which has been subjected to the shading correction is outputted from the ROM 15. The timing controller 16 controls the operation timings of the RAM part 14, as will be described later.

The output image data $D_{OUT}$ is obtained by use of a function $D_{OUT}=f(D_R, D_S)$ which is pre-stored in the ROM 15 at predetermined addresses determined by the data $D_R$ and $D_S$. The function $D_{OUT}$ may be described by the following, where K is a constant.

$$D_{OUT} = f(D_R, D_S) = K \times D_R/D_S$$

For example, the function $D_{OUT}$ is pre-stored in the ROM 15 at predetermined addresses for each combination of the data $D_S$ and $D_R$.

FIGS. 4(A) through 4(C) are timing charts for explaining the operation of the block system shown in FIG. 2 during the scanning of the white substrate 32 and during the scanning of the document on the paper 42. FIG. 4(A) shows a main scan synchronizing signal $S_1$, where $T_1$ denotes one main scan interval. FIG. 4(B) shows a gate signal $S_2$ which is used when scanning the white substrate 32, where $T_2$ denotes an effective scanning interval and $T_2 = 32 \times T_1$. In the present embodiment, the resolution of the scan is 16 picture elements/mm for the main and sub scans, and $T_2$ corresponds to 2 mm in a distance along the sub scanning direction. In other words, $T_2$ corresponds to the distance between two mutually adjacent scanning lines along a direction perpendicular to the main scanning direction. FIG. 4(C) shows a gate signal $S_3$ which is used when scanning the document on the paper 42, where $t_1$ denotes a top end of the paper 42 and $t_2$ denotes a bottom end of the paper 42 as shown in FIG. 3. In other words, in order to enter the shading data, the white substrate 32 is scanned before the actual scanning of the document on the paper 42, as described before.

Figure 5:
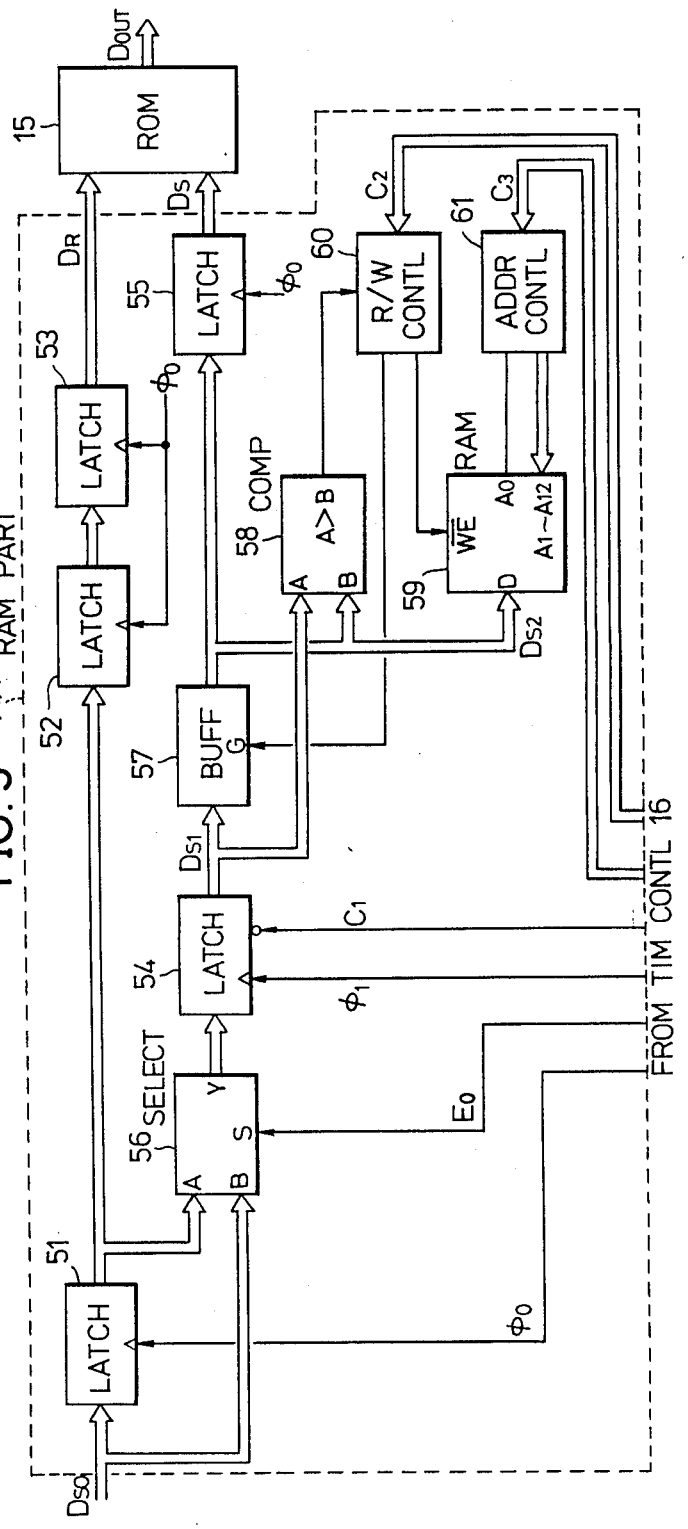
FIG. 5 is a system circuit diagram showing an embodiment of an essential part of the shading correction system shown in FIG. 2.

FIG. 5 is a system circuit diagram showing an embodiment of an essential part of the block system shown in FIG. 2. In FIG. 5, those parts which are the same as those corresponding parts in FIG. 2 are designated by the same reference numerals. In FIG. 2, a RAM part 14A comprises latch circuits 51 through 55, a selector 56, a buffer driver 57, a comparator 58, a RAM 59, a read/write controller 60, and an addressing controller 61. In the present embodiment, the image data $D_R$ are supplied to the ROM 15 from the RAM part 14A and not directly from the A/D converter 13, but the operation of the circuit system shown in FIG. 5 is basically the same as that of the corresponding part of the block system shown in FIG. 2. The latch circuits 52 and 53 simply provide a delay for the purpose of matching the timing of the image data $D_R$ with the timing of the shading data $D_S$, so that a datum of the image data $D_R$ obtained at the scanning position $N = N_0$ and a datum of the shading data $D_S$ also obtained at the scanning position $N = N_0$ are supplied simultaneously to the ROM 15.

In FIG. 5, a clock signal $\phi_0$ has a frequency dependent on the picture elements in one scanning line, and a clock signal $\phi_1$ has a period two times the period of the clock signal $\phi_0$. These clock signals $\phi_0$ and $\phi_1$ are obtained from the timing controller 16 shown in FIG. 2. A signal EO is also obtained from the timing controller 16 and indicates whether the scanning line is an even numbered scanning line or an odd numbered scanning line. A signal A>B outputted from the comparator 58 and supplied to the read/write controller 60 has a logic value "1" when an input A to the comparator 58 is greater than an input B to the comparator 58 and otherwise has a logic value "0". A signal G which is outputted from the read/write controller 60 is supplied to the buffer driver 57, and an output of the buffer driver 57 becomes valid only when the signal G has a logic value "1" and the output of the buffer driver 57 has a high impedance when the signal G has a logic value "0". A write enable signal $\overline{WE}$ which is outputted from the read/write controller 60 and is supplied to the RAM 59 is used for enabling a write-in operation to the RAM 59.

A signal $C_1$ obtained from the timing controller 16 is supplied to the latch circuit 54 so as to clear the latch circuit 54. Before writing the shading data into the RAM 59, the signal $C_1$ clears the data which are latched by the latch circuit 54 so as to write data "0" into the RAM 59, that is, initially clear the RAM 59. Signals $C_2$ and $C_3$ are also obtained from the timing controller 16 and are supplied to the read/write controller 60 and the addressing controller 61, respectively, so as to control the operations of these controllers 60 and 61.

According to the present embodiment, the white substrate 32 is scanned a plurality of times, and the comparator 58 compares the shading data obtained by the present scan and the shading data obtained by the previous scan and read out from the RAM 59. But when renewing the shading data in the RAM 59 depending on the compared result, the renewing is carried out in two stages. The scanning of the white substrate 32 is divided into a first group of even numbered scans and a second group of odd numbered scans. In a first stage, the renewal of the shading data is carried out for the first group of even numbered scans, that is, for the even numbered scanning lines on the white substrate 32. In a second stage, the renewal of the shading data is carried out for the second group of odd numbered scans, that is, for the odd numbered scanning lines on the white substrate 32. In other words, the renewal of the shading data is carried out for one-half the total area on the white substrate 32 scanned in the first stage for a first picture element group comprising the even (or odd) numbered picture elements, and the renewal of the shading data is carried out for the remaining one-half of the total area on the white substrate 32 scanned in the second stage for a second picture element group comprising the odd (or even) numbered picture elements.

Figure 6:
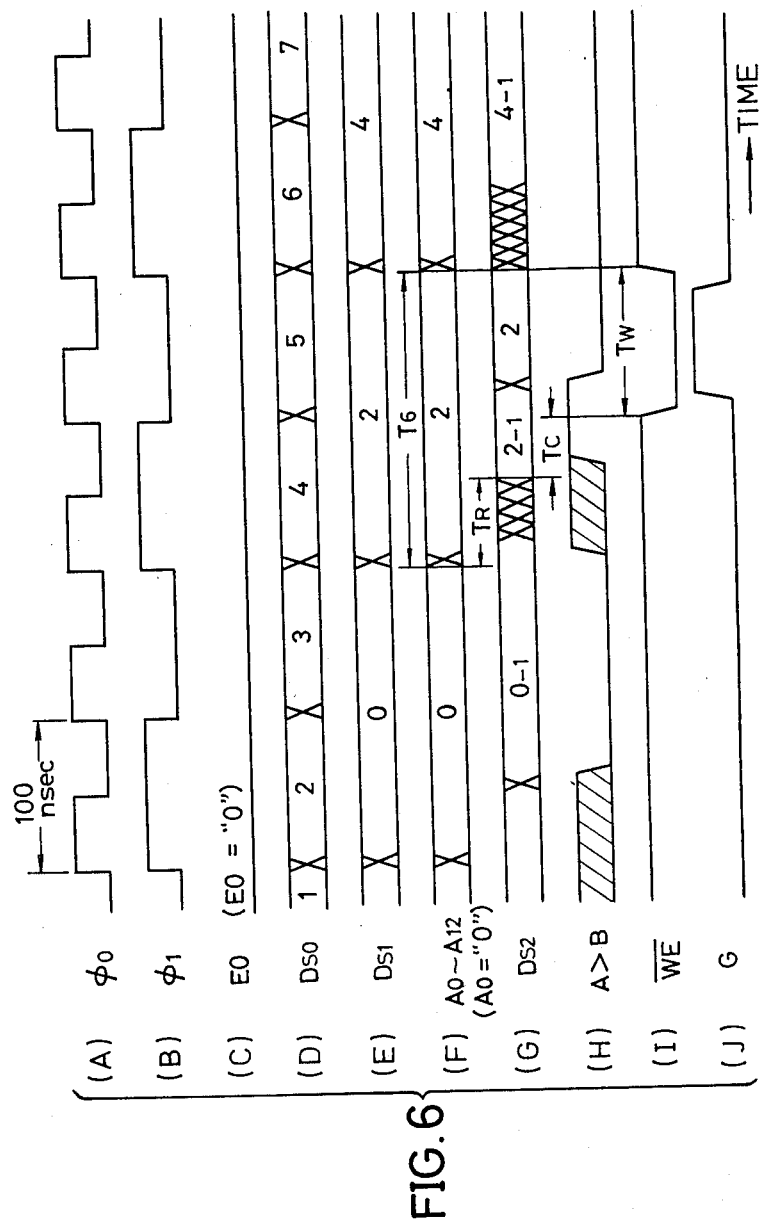
FIGS. 6(A) through 6(J) are timing charts for explaining the operation of the shading correction system during even numbered scans of the white substrate.

FIGS. 6(A) through 6(J), FIGS. 7(A) through 7(J) and FIGS. 8(A) through 8(H) are time charts for explaining the operation of the circuit system shown in FIG. 5. FIGS. 6 (A) through 6(J) are time charts for explaining the operation for the case where the logic value of the signal EO is "0" and the even numbered scan of the white substrate 32 is carried out. Similarly, FIGS. 7(A) through 7(J) are time charts for explaining the operation for the case where the logic value of the signal EO is "1" and the odd numbered scan of the white substrate 32 is carried out. FIGS. 8(A) through 8(H) are time charts for explaining the operation when the document on the paper 42 is scanned. In these time charts, the numerals inserted within the signal, such as the numerals "1", "2", "3", ..., "7" inserted into the signal $D_{S0}$ in FIG. 6(D), indicate the sequence of the picture element positions along the main scanning direction. These numerals may also be considered as the addresses of the RAM 59. Furthermore, a designation "$2_{-1}$" used in the signal $D_{S2}$ shown in FIG. 6(G), for example, indicates the output at the picture element position "2" (that is, at the address "2" of the RAM 59) and the subscript "$-1$" indicates that this output (datum) is already stored in the RAM 59 by the scanning carried out up to the previous scanning.

Next, a description will be given on the operation of writing the shading data into the RAM 59, by referring to FIGS. 6(A) through 6(J). FIGS. 6(A) and 6(B) show the clock signals $\phi_0$ and $\phi_1$, respectively. When the white substrate 32 is being scanned, the shading data $D_{S0}$ successively obtained from the A/D converter 13 shown in FIG. 2 are supplied to the selector 56 indirectly through the latch circuit 51 as the input A and directly as the input B. When the signal EO has the logic value "0" as shown in FIG. 6(C), the selector 56 selects the input A. The shading data $D_{S0}$ from the latch circuit 51 are supplied to the latch circuit 54 from the selector 56, and shading data $D_{SI}$ shown in FIG. 6(E) are obtained from the latch circuit 54. The addressing controller 61 controls the incrementing of the address with such a timing that the addresses of the RAM 59 changes as "0", "2", "4", ... in correspondence with the picture element positions "0", "2", "4", ... of the shading data $D_{SI}$, responsive to the signal $C_3$ from the timing controller 16.

Out of the address bits $A_0$ through $A_{12}$, the address bit $A_0$ is set to "0". Hence, as shown in FIG. 6(F), the address indicated by the address bits $A_0$ through $A_{12}$ is incremented by two with the same period as the shading data $D_{SI}$ and in synchronism with the clock signal $\phi_1$. As a result, only the even numbered addresses "0", "2", "4", ... of the RAM 59 are accessed, and the stored shading data at these addresses are read out from the RAM 59. At the address "0", $D_{S2} = 0_{-1}$ as shown in FIG. 6(G). When it is assumed that $D_{SI}(0) \leq D_{S2}(0_{-1})$, that is, the present (new) shading datum is less than or equal to the shading datum pre-stored at the address "0", the condition $A > B$ is not satisfied in the comparator 58 and the output signal $A > B$ of the comparator 58 has the logic value "0" as shown in FIG. 6(H). As a result, the write enable signal $\overline{WE}$ outputted from the read/write controller 60 has a logic value "1" as shown in FIG. 6(I) and no write operation is carried out with respect to the RAM 59. Next, when $D_{SI}(2) > D_{S2}(2_{-1})$, that is, the present (new) shading datum is greater than the shading datum pre-stored at the address "2", the condition $A > B$ is satisfied in the comparator 58 and the output signal $A > B$ of the comparator 58 has the logic value "1" as shown in FIG. 6(H). As a result, the write enable signal $\overline{WE}$ outputted from the read/write controller 60 has a logic value "0" as shown in FIG. 6(I) and a write operation is carried out with respect to the RAM 59 so as to write the new datum $D_{SI}(2)$ into the RAM 59. During this write operation, a data line D of the RAM 59 assumes an input mode during a write interval $T_W$ shown in FIG. 6(I) while the buffer driver 57 assumes an output mode responsive to the signal G shown in FIG. 6(J) which has the logic value "1". Hence, during the write interval $T_W$, $D_{S2} = D_{SI} = (2)$, and the new datum (2) is written into the address "2" of the RAM 59 and the shading datum is renewed.

As described above, when the present (new) shading datum is greater than the pre-stored (old) shading datum, three operations are carried out during a time interval $T_6$ ($= T_R + T_C + T_W$) shown in FIG. 6(F) for each address. This time interval $T_6$ is made up of a read interval $T_R$ shown in FIG. 6(G) in which a read operation is carried out so as to read out the old shading datum from the RAM 59, a comparing interval $T_C$ shown in FIG. 6(H) in which the new shading datum is compared with the old shading datum, and a write interval $T_W$ shown in FIG. 6(I) in which the new shading datum is written into the RAM 59.

Figure 7:
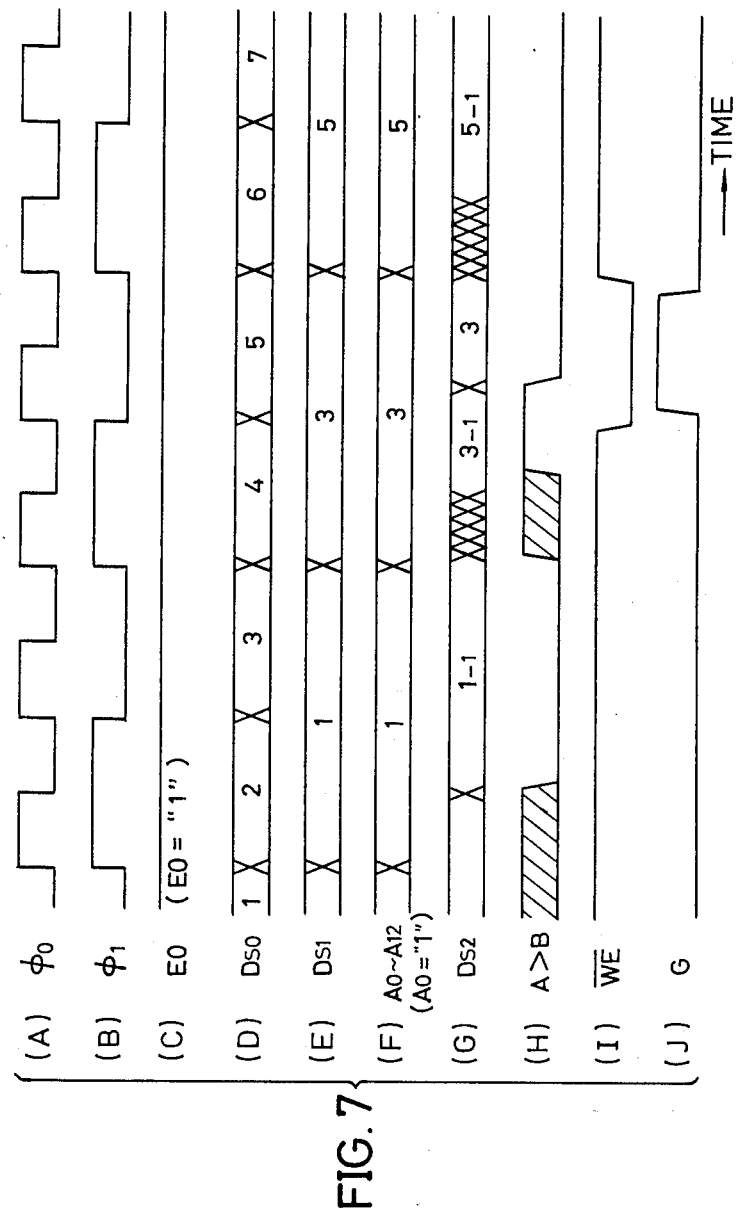
FIGS. 7(A) through 7(J) are timing charts for explaining the operation of the shading correction system during odd numbered scans of the white substrate.

FIGS. 7(A) through 7(J) are timing charts for explaining the case where the signal EO has the logic value "1", and FIGS. 7(A), 7(B) and 7(D) are identical to FIGS. 6(A), 6(B) and 6(D), respectively. In this case, the selector 56 selects the input B, that is, the shading data $D_{S0}$ obtained directly from the A/D converter 13. The shading data $D_{SI}$ shown in FIG. 7(E) are obtained from the latch circuit 54. The addressing controller 61 controls the incrementing of the address with such a timing that the addresses of the RAM 59 changes as "1", "3", "5", ... in correspondence with the picture element positions "1", "3", "5", ... of the shading data $D_{SI}$, responsive to the signal $C_3$ from the timing controller 16.

Out of the address bits $A_0$ through $A_{12}$, the address bit $A_0$ is set to "1". Hence, as shown in FIG. 7(F), the address indicated by the address bits $A_0$ through $A_{12}$ is incremented by two with the same period as the shading data $D_{SI}$ and in synchronism with the clock signal $\phi_1$. As a result, only the odd numbered addresses "1", "3", "5", ... of the RAM 59 are accessed, and the stored shading data at these addresses are accessed. At the address "1", $D_{S2} = 1_{-1}$ as shown in FIG. 7(G). When it is assumed that $D_{SI}(1) \leq D_{S2}(1_{-1})$, that is, the present (new) shading datum is less than or equal to the shading datum pre-stored at the address "1", the output signal $A > B$ of the comparator 58 has the logic value "0" as shown in FIG. 7(H). As a result, the write enable signal $\overline{WE}$ outputted from the read/write controller 60 has a logic value "1" as shown in FIG. 7(I) and no write operation is carried out with respect to the RAM 59.

Next, when $D_{SI}(3) > D_{S2}(3_{-1})$, that is, the present (new) shading datum is greater than the shading datum pre-stored at the address "3", the output signal $A > B$ of the comparator 58 has the logic value "1" as shown in FIG. 7(H). As a result, the write enable signal $\overline{WE}$ outputted from the read/write controller 60 has a logic value "0" as shown in FIG. 7(I) and a write operation is carried out with respect to the RAM 59 so as to write the new datum $D_{SI}(3)$ into the RAM 59 since the signal G shown in FIG. 7(J) has the logic value "1".

Figure 8:
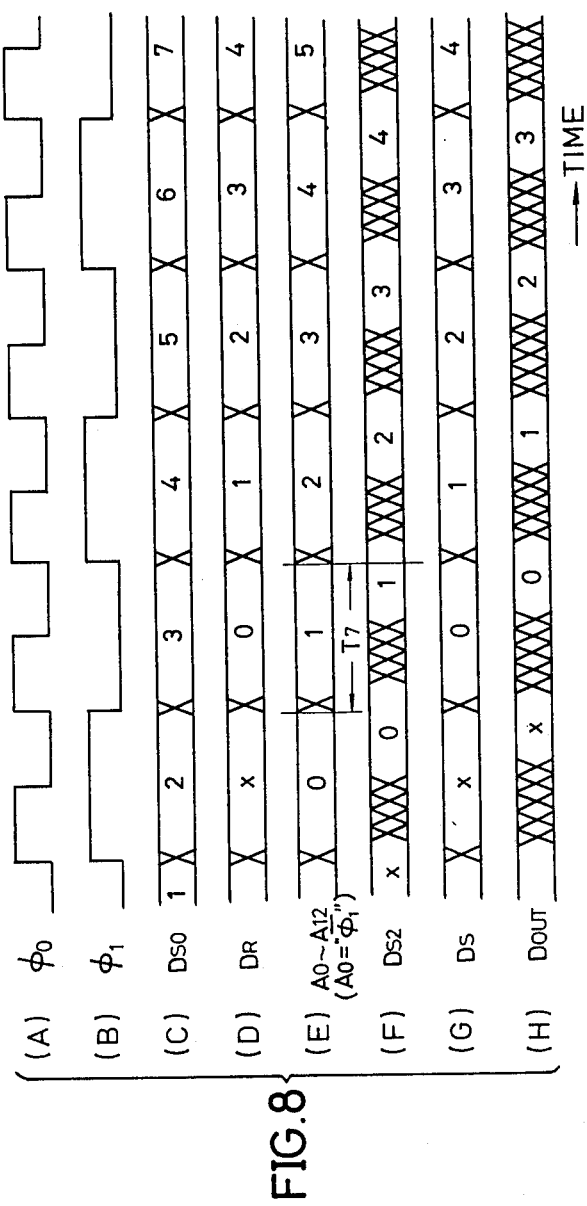
FIGS. 8(A) through 8(H) are timing charts for explaining the operation of the shading correction system during the scan of the intended image.

Next, a description will be given on the operation of the circuit system shown in FIG. 5 when the document on the paper 42 is scanned, by referring to FIGS. 8(A) through 8(H). FIGS. 8(A), 8(B) and 8(C) are identical to FIGS. 6(A), 6(B) and 6(D), respectively. In this case, only the read operation is carried out with respect to the RAM 59.

As may be seen by comparing FIGS. 8(C) and 8(D), the image data $D_R$ is delayed by three picture elements compared to the image data $D_{S0}$. The address bit $A_0$ is set to "$\overline{\phi}_1$", and the address of the RAM 59 is incremented by one in synchronism with the clock signal $\phi_0$ as "0", "1", "2", "3", .... On the other hand, the stored shading data $D_{S2}$ in the RAM 59 are read out as "0", "1", "2", "3", ... as shown in FIG. 8(F). The shading data $D_{S2}$ are latched by the latch circuit 55 and are supplied to the ROM 15 as shading data $D_S$ shown in FIG. 8(G). As may be seen from FIGS. 8(D) and 8(G), the address timings of the data $D_S$ and $D_R$ coincide. Hence, the ROM 15 is accessed simultaneously by the data $D_S$ and $D_R$ and the output data $D_{OUT}$ are obtained as "0", "1", "2", ... as shown in FIG. 8(H).

Noting on the operation of the RAM 59, it is seen from FIGS. 8(A) through 8(H) that the RAM operates with a cycle of a read interval $T_7$ shown in FIG. 8(E). When this read interval $T_7$ is compared with the interval $T_6$ shown in FIG. 6(F), it can be seen that $T_6 = 2T_7$. In the embodiment, the frequency of the picture elements is 10 MHz, that is, the period T of the clock signal $\phi_0$ is 100 nsec. On the other hand, the interval $T_6 = 200$ nsec is made up of the read interval $T_R \simeq 70$ nsec, the comparing interval $T_C \simeq 40$ nsec, and the write interval $T_W \simeq 90$ nsec. This means that a RAM having an access speed of 55 nsec, for example, is sufficient for use as the RAM 59.

However, when the RAM having the access speed of 55 nsec is used and the processing speed of the peripheral circuits of the RAM is the same as that of the embodiment described heretofore, it is extremely difficult to carry out the three operations of reading, comparing and writing within the short time of 100 nsec as would be required in the conventional shading correction system. In addition, a RAM having an extremely high access speed is expensive and the use of such a RAM will considerably increase the production cost of the shading correction system.

But according to the present invention, it is possible to use a RAM only having an access speed (for example, 55 nsec) which can cope with the speed of the incoming picture element data, and carry out the reading, comparing and writing operations with respect to the RAM when entering the shading data so as to renew the shading data according to the needs.

In the described embodiment, the shading correction system according to the present invention is applied to the copying apparatus, but the present invention is applicable to any image scanning apparatus defined in the introductory part of the present specification.

In addition, in the described embodiment, the first group of scans comprises the even numbered scans and the second group of scans comprises the odd numbered scans, but it is possible to divide the scans into a first group of consecutive scans comprising a first half of the total number of scans and a second group of consecutive scans comprising a second half of the total number of scans. In addition, the renewal of the shading data may be carried out for one-half the total area on the white substrate scanned in the first stage for a first group of consecutive picture elements, and the renewal of the shading data may be carried out for the remaining one-half of the total area on the white substrate scanned in the second stage for a second group of consecutive picture elements, where the first group of consecutive picture elements is made up of consecutive picture elements in a first half of each even (or odd) scan and the second group of consecutive picture elements is made up of consecutive picture elements in a second half of each odd (or even) scan. Furthermore, the total number of scans may be divided into any plurality of groups of scans, although it is easier to realize the hardware when the number of groups is $2^n$, where n is an integer.

Moreover, instead of clearing the RAM before the scanning of the white substrate starts, it is possible to write a constant value into the RAM. When it is assumed that the output signal level of the line image sensor during the scanning of the white substrate will not be less than 50% in FIG. 1A, for example, it is possible to write a constant value corresponding to this 50% level into the RAM before the scanning of the white substrate starts.

In addition, it is not essential to allocate the storage area of the RAM in accordance with the data obtained during the odd and even scans as in the case of the described embodiment. In other words, the allocation of the storage area of the RAM may be independent of the manner in which the total number of scans are grouped.

Further, the present invention is not limited to these embodiments, but various variations and modifications may be made without departing from the scope of the present invention.

What is claimed is:

1. A shading correction system for an image scanning apparatus which has optical scanning means for scanning an intended image in a plurality of scanning lines, said shading correction system comprising:

a white substrate which is scanned a plurality of times by said optical scanning means when obtaining shading data;

memory means for storing an output of said optical scanning means as the shading data when said optical scanning means scans said white substrate;

comparing means for comparing present shading data obtained from said optical scanning means which scans said white substrate and previous shading data stored in said memory means, and for renewing the shading data by writing the present shading data into said memory means in place of the previous shading data stored when the present shading data is greater than the previous shading data;

shading correction means supplied with the output of said optical scanning means as image data of said intended image when said optical scanning means scans said intended image, for correcting shading in the image data by carrying out a predetermined operation on the image data by use of the shading data read out of said memory means; and control means for controlling read and write operation timings of said memory means so that the operation of comparing the present shading data and the previous shading data and the operation of renewing the shading data depending on the compared result are carried out in N stages, each of said N stages carrying out the comparing and renewing operation for one of N different groups of scans over said white substrate for one of N different picture element groups each comprising 1/N a total number of picture elements in each scan, where N is an integer.

2. A shading correction system as claimed in claim 1 in which N is equal to two and said groups of scans consist of a first group and a second group, said first group being made up of even numbered scanning lines, said second group being made up of odd numbered scanning lines.

3. A shading correction system as claimed in claim 1 in which N is equal to two and said groups of scans consist of a first group and a second group, said first group being made up of consecutive scanning lines in a first half of a total number of scans over said white substrate, said second group being made up of consecutive scanning lines in a latter half of the total number of scans.

4. A shading correction system as claimed in claim 1 in which N is equal to two and said picture element groups consist of first and second picture element groups, said first picture element group being made up of even numbered picture elements in each scan, said second picture element group being made up of odd numbered picture elements in each scan.

5. A shading correction system as claimed in claim 1 in which N is equal to two and said picture element groups consist of first and second picture element groups, said first picture element group being made up of consecutive picture elements in a first half of each scan, said second picture element group being made up of consecutive picture elements in a second half of each scan.

6. A shading correction system as claimed in claim 1 in which said memory means comprises a random access memory.

7. A shading correction system as claimed in claim 1 in which said shading correction means comprises a read only memory.

8. A shading correction system as claimed in claim 7 in which said read only memory pre-stores a function $f(D_R, D_S) = K \times D_R/D_S$ and is accessed by a combination of $D_R$ and $D_S$, where $D_R$ denotes the image data from said optical scanning means and $D_S$ denotes the shading data read out from said memory means.

9. A shading correction system as claimed in claim 1 in which said said optical scanning means initially scans said white substrate before scanning said intended image every time said intended image is to be scanned.

10. A shading correction system as claimed in claim 1 which further comprises means for initially clearing contents of said memory means every time said intended image is to be scanned.

11. A shading correction system as claimed in claim 1 which further comprises means for initially setting contents of said memory means to a constant value every time said intended image is to be scanned, said constant value being less than a maximum output level obtainable from said optical scanning means when said white substrate is scanned.

* * * * *

UNITED STATES PATENT AND TRADEMARK OFFICE
CERTIFICATE OF CORRECTION

PATENT NO. : 4,760,464

DATED : Jul. 26, 1988

INVENTOR(S) : Yukio SAKANO

It is certified that error appears in the above-identified patent and that said Letters Patent is hereby corrected as shown below:

On the Title Page, Item [30]:

The Priority Data is incorrect; should read as follows:

-- Jun. 30, 1986 [JP] Japan......................61-152945 --

Signed and Sealed this

Twenty-first Day of February, 1989

*Attest:*

DONALD J. QUIGG

*Attesting Officer*      *Commissioner of Patents and Trademarks*